US010094594B2

(12) United States Patent
Nitschke

(10) Patent No.: US 10,094,594 B2
(45) Date of Patent: Oct. 9, 2018

(54) DEVICE AND SYSTEM FOR THE IMPLEMENTATION OF THE FALLING POND METHOD TO COUNTER THE UPWARD DIFFUSSION OF SALT IN A SALINITY GRADIENT SOLAR POND

(71) Applicant: Good Earth Mechanics, LLC, New Ipswich, NH (US)

(72) Inventor: George Samuel Nitschke, New Ipswich, NH (US)

(73) Assignee: Good Earth Mechanics, LLC, New Ipswich, NH (US)

( * ) Notice: Subject to any disclaimer, the term of this patent is extended or adjusted under 35 U.S.C. 154(b) by 548 days.

(21) Appl. No.: 14/699,652

(22) Filed: Apr. 29, 2015

(65) Prior Publication Data

US 2015/0308716 A1    Oct. 29, 2015

Related U.S. Application Data

(60) Provisional application No. 61/985,539, filed on Apr. 29, 2014.

(51) Int. Cl.
*B01D 1/02* (2006.01)
*F24S 10/13* (2018.01)
*B01D 1/00* (2006.01)

(52) U.S. Cl.
CPC ............ *F24S 10/13* (2018.05); *B01D 1/0035* (2013.01); *B01D 1/0064* (2013.01); *B01D 1/02* (2013.01); *Y02E 10/44* (2013.01)

(58) Field of Classification Search
CPC ...... B01D 1/0035; B01D 1/0064; B01D 1/02; F24J 2/34; F24J 2/42; F24J 2/46
See application file for complete search history.

(56) References Cited

U.S. PATENT DOCUMENTS

| 4,333,736 A * | 6/1982 | Shachar | B01D 9/0031 23/295 S |
| 4,370,860 A * | 2/1983 | Assaf | F03G 3/00 60/641.11 |
| 4,446,025 A * | 5/1984 | Assaf | E02D 29/077 119/212 |
| 4,446,700 A * | 5/1984 | Bronicki | F03G 6/005 290/4 C |
| 4,498,300 A * | 2/1985 | Assaf | F03G 6/00 126/561 |

(Continued)

*Primary Examiner* — Jonathan Miller
(74) *Attorney, Agent, or Firm* — Bay State IP, LLC

(57) ABSTRACT

A Salinity Gradient Solar Pond has saturated salt water in the bottom of the pond and nearly fresh water at the top, with a gradient zone between the top and bottom. Due to this salinity stratification the upward diffusion of salt is a natural consequence in SGSP's. This upward diffusion of salt has been found to range 60-80 gr/m$^2$/day (Tabor, H.; *Solar Ponds*, Solar Energy, v. 27 (3), pp. 181-194, 1981 and v. 30 (1), pp. 85-86, 1983). Controlling the salinity gradient in SGSP systems is vital to their reliable operation. One proposed method for controlling the salinity gradient is the so called "Falling Pond" method, where water is extracted from the saturated bottom layer by some means and returned to the nearly fresh upper layer. This action creates a downward velocity in the pond's layers which can be matched to counter the upward diffusion of salt, thereby maintaining the pond's gradient stationary in space.

4 Claims, 7 Drawing Sheets

(56) References Cited

U.S. PATENT DOCUMENTS 4,541,244 A * 9/1985 Assaf .................... F24J 2/0466
126/400
5,346,592 A * 9/1994 Madani ................... B01D 1/26
159/46

* cited by examiner

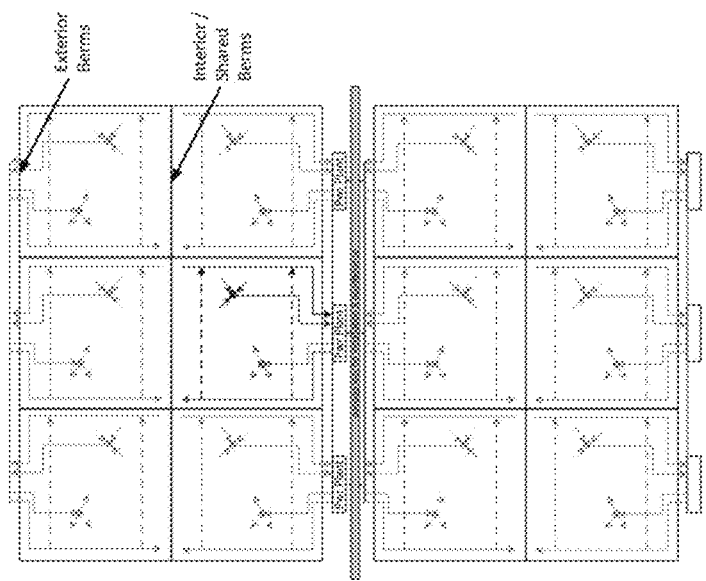
FIG. 2C
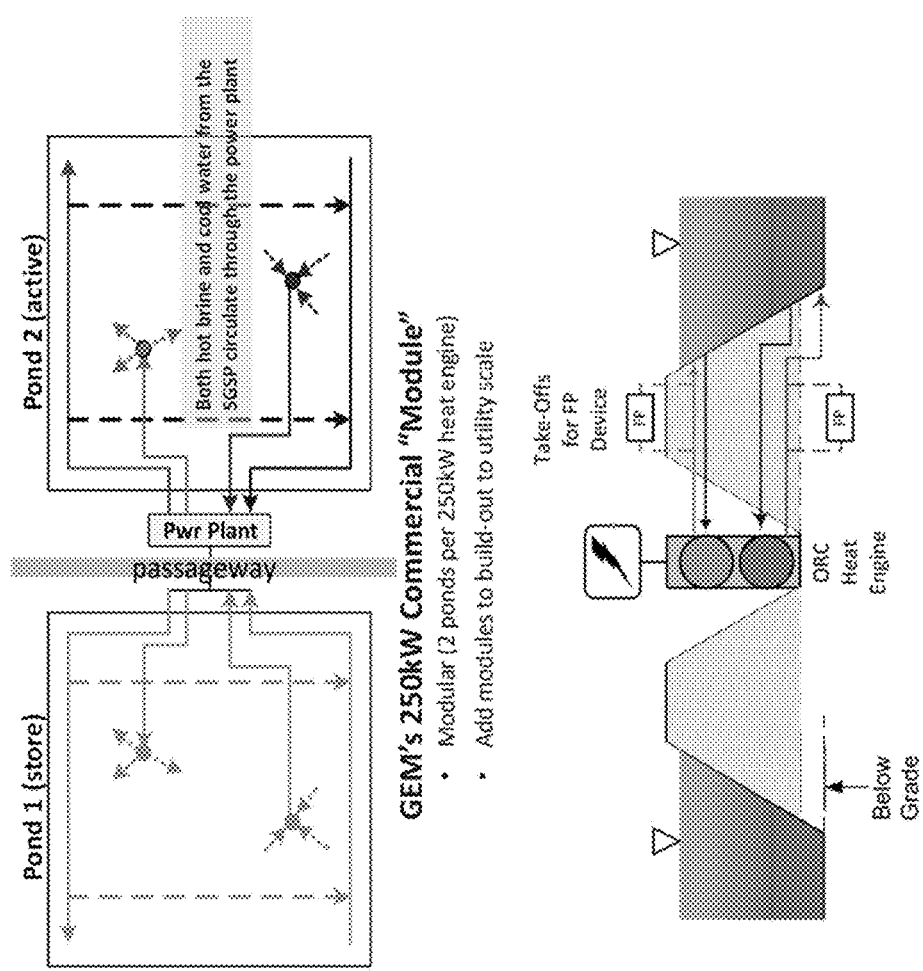
FIG. 2A
FIG. 2B

| Falling Pond Velocity & Flow | | Typical 250kW ORC Operating Conditions | |
|---|---|---|---|
| Flux Area Per Pond at LCZ top (acres) | 6.73 | Temperature of LCZ Flow – In (F) | 193 |
| Salt Upward Diffusion Velocity (inches/year) | 1.6 | Temperature of LCZ Flow – Out (F) | 173 |
| Required FPD H2O Flow per Pond (gpm) | 0.56 | LCZ Flow (gpm) | 1000 |
| Required FPD H2O Flow per 250kW (gpm) | 1.11 | Temperature of UCZ Flow – In (F) | 67.8 |
| | | Temperature of UCZ Flow – Out (F) | 80.0 |
| Conditions in the Flash Tank Evaporator | | UCZ Flow (gpm) | 1500 |
| Boiling Point Rise ORC Exit Brine (F) | 13 | FPD Thermal Parasitic Loss | |
| Superheated Vapor Temperature (F) | 173 | Heat Loss FPD H2O Flow (BTU/min) | 10,059 |
| Superheated Vapor Enthalpy (BTU/lbm) | 1135 | Heat Loss FPD H2O Flow (kW-thermal) | 176.72 |
| Superheated Vapor Specific Volume (cf/lbm) | 92.1 | Typical ORC Thermodynamic Eff | 8.5% |
| Uncondensed Vapor Flow Rate (cfm) | 852 | Typical Heat Supply for 250kW (kw-th) | 2941 |
| Uncondensed Vapor Mass Rate (ppm) | 9.25 | Thermal Parasitic Loss for FPD | 6% |
| Conditions in the Mix Tank Condenser | | Mix Tank Prime Mover Performance | |
| Saturated H2O Temperature (less BPR) (F) | 160 | Exhauster Drive Flow (gpm) – 5" multi-jet | 302 |
| Condensing Pressure (less BPR) (psia) | 4.75 | Exhauster Drive Pressure (psid) | 25 |
| Entrance Quality | 1.00 | Exhauster Required Pump Power (kW) | 3.86 |
| Exit Quality | 0.0305 | Exhauster Parasitic Load | 1.54% |
| UCZ Circulation Feed Flow (ppm) | 115.7 | Eductor Drive Flow (gpm) – 1.5" single-jet | 20.4 |
| UCZ Circulation Feed Enthalpy (BTU/lbm) | 48.09 | Eductor Drive Pressure (psid) | 30 |
| Mix Tank Condensing Liq. Enthalpy (BTU/lbm) | 127.96 | Eductor Required Pump Power (kW) | 0.31 |
| Mix Tank Condensing Latent Heat (BTU/lbm) | 1002.2 | Eductor Parasitic Load | 0.12% |
| Mix Tank Condensing Liq. Sp. Vol. (cf/lbm) | 0.0164 | | |
| Mix Tank Condensing Vap. Sp. Vol. (cf/lbm) | 77.23 | Flash Tank Prime Mover Performance | |
| Mix Tank Condensed Exit Flow (cfm) | 8.1 | LCZ Pump Pressure (psid) | 15 |
| Mix Tank Exit Flow (ppm) | 124.9 | LCZ Return Flow (gpm) | 11.11 |
| | | LCZ Pump Power (kW) | 0.09 |
| FPD: Total Thermal Parasitic (%) | 6% | LCZ Pump Parasitic Load | 0.04% |
| FPD: Total Power Parasitic (%) | 0.16% - 1.56% | | |

FIG. 7

DEVICE AND SYSTEM FOR THE IMPLEMENTATION OF THE FALLING POND METHOD TO COUNTER THE UPWARD DIFFUSSION OF SALT IN A SALINITY GRADIENT SOLAR POND

CROSS REFERENCE TO RELATED APPLICATION

This application takes priority from and claims the benefit of U.S. Provisional Patent Application Ser. No. 61/985,539 filed on Apr. 29, 2014, the contents of which are herein incorporated by reference.

BACKGROUND OF THE INVENTION

Field of the Invention

The present system and method relate generally to Salinity Gradient Solar Ponds (SGSP), and more particularly to a system and method to maintaining the salinity gradient in a SGSP.

Description of the Related Art

A SGSP is a shallow, salt-gradient pond that enables the collection and storage of solar thermal energy (see FIG. 1). In the SGSP, solar energy is absorbed by the pond's bottom which in turn heats the adjacent salt-saturated fluid (the "Lower Convective Zone", or LCZ, in FIG. 1). Since the LCZ is heavier than the layers above it due to its higher salinity, the heated fluid cannot rise in the pond and cool, like a normal pond, but rather remains in the bottom layer, getting hotter as it stores more solar thermal energy. Over time, typically several months from initial construction, as the LCZ stores more and more solar thermal energy, the brine temperature will approach boiling. This collected and stored solar thermal energy may be withdrawn (pumped hot brine) as process heat which may be used to generate electricity using an off the shelf, low-temperature heat engine.

The SGSP may collect and store heat, and deliver power at an average, uniform rate (base-load), or may deliver power on an as needed basis (on-demand) giving distribution control of the power output rather than being forced to produce power solely when the wind blows or the sun shines, making SGSP systems many times more effective than intermittent renewables. The SGSP systems may be easily constructed over large areas.

SUMMARY OF THE INVENTION

The instant system and method, as illustrated herein, is clearly not anticipated, rendered obvious, or even present in any of the prior art mechanisms, either alone or in any combination thereof. Thus the several embodiments of the instant system and method are illustrated herein.

Good Earth Mechanics (GEM) is commercializing the SGSP technology. The GEM SGSP team is comprised of the principals who operated the longest running SGSP engineering development and pilot demonstration in the world to date (University of Texas, El Paso) from 1985 to 2002 (*Advancements in Salinity Gradient Solar Pond Technology Based on 16 Years of Operational Experience*, Huanmin Lu, Andrew H. P. Swift, Herbert D. Hein, Jr., John C. Walton; J. Solar Energy Eng., v. 126, p. 759-767, May 2004). In one embodiment, GEM will build and deploy the SGSP systems using its 250 kW commercial module, which preferably u two pond units for each module (see FIG. 2). The ponds are bermed impoundments versus excavated holes, where the dirt from the pond centers is used to form the berms. The GEM SGSP systems are modularly extensible: the GEM SGSP power system site can be as small as 250 kW, or scaled up to 100's of MW's, by simply adding more SGSP modules. A cutaway of the GEM SGSP system in FIG. 2 shows how a typical off-the-shelf, low-temperature Organic Rankine Cycle (ORC) heat engine circulates both the pond's hot bottom brine and the cool surface water. The hot brine is the thermal source and the cool water serves as the ORC heat sink; it's the temperature difference between the bottom and the top of the SGSP system that drives the heat engine. Also note on FIG. 2 where it's notionally indicated that the disclosed Falling Pond Device ("FP Device" in the figure) will plumb to the hot and cold SGSP circulation.

Due to the salinity stratification in the SGSP the upward diffusion of salt is a natural consequence. This upward diffusion of salt has been found to range 60-80 $gr/m^2/day$ (Tabor, H.; *Solar Ponds*, Solar Energy, v. 27 (3), pp. 181-194, 1981 and v. 30 (1), pp. 85-86, 1983). Controlling the salinity gradient in SGSP systems is vital to their reliable and efficient operation. One method proposed for controlling the salinity gradient is the so called "Falling Pond" method. The Falling Pond method is depicted in FIG. 3. A "Falling Pond Device" shown in the figure is intended to continuously maintain the salinity gradient in-place by extracting water from the saturated brine on the bottom of the pond and moving it to the top; this action causes the pond's layers to be continuously cycled downward, or "fall". This rate of fall, or downward velocity, can be controlled to match the rate of upward diffusion of salt in the SGSP, thereby maintaining the gradient in-place.

Other methods used for controlling the SGSP gradient include the Surface Wash method depicted in FIG. 4. In the Surface Wash method the salt is allowed to diffuse upward to the surface layer. As the surface layer gets saltier, it is replaced with fresh water, or "washed". The displaced salty surface water is evaporated to concentrated salt brine in a separate evaporation pond and then returned to the SGSP bottom. This method, while workable for SGSP demonstration work and the typical gradient maintenance practice heretofore, is not practical for large scale SGSP commercialization due to the additional land requirement and the higher water and heat losses required to practice the method. The Falling Pond practice is superior as it minimizes water, heat loss, required land, and costs compared with the Surface Wash method, provided that a cost-effective device can be implemented to facilitate the practice, which is the subject of this disclosure.

There has thus been outlined, rather broadly, the more=important features of a system and method for the implementation of the falling pond method to counter the upward diffusion of salt in a SGSP in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIGS. 2A-2C illustrates depicts one embodiment of a Good Earth Mechanics (GEM) 250 kW Commercial SGSP Module, which may utilize at least two pond units for each module.

FIG. 7 illustrates a table which shows performance projections for the Falling Pond Device in operation maintaining the SGSP gradient in both ponds of a GEM 250 kW SGSP module.

DETAILED DESCRIPTION OF THE SEVERAL EMBODIMENTS

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

GEM has developed two fundamental practices to efficiently maintain the SGSP gradient in commercial operation. The first practice, a Falling Pond Device to enable the Falling Pond method, is disclosed in this Application. The second, coined by GEM as the "Pond Rolling" method, will be disclosed in a subsequent Application.

It can be shown that the downward "Falling Pond" velocity required to counter the natural upward diffusion of salt is:

$$V = \frac{1}{s}\left(\kappa_s \frac{\partial s}{\partial z}\right) \quad [1]$$

where
  s=salt concentration
  $\kappa_s$=salt diffusivity (~1.55E-09 m²/s)
  z=depth (m)
  V=velocity (m/s)

For a typical GEM 250 kW commercial SGSP "module", as depicted in FIG. 2, the required Falling Pond velocity is approximately 1.29E-09 m/s, or ~1.6 inches per year.

Figure 5:
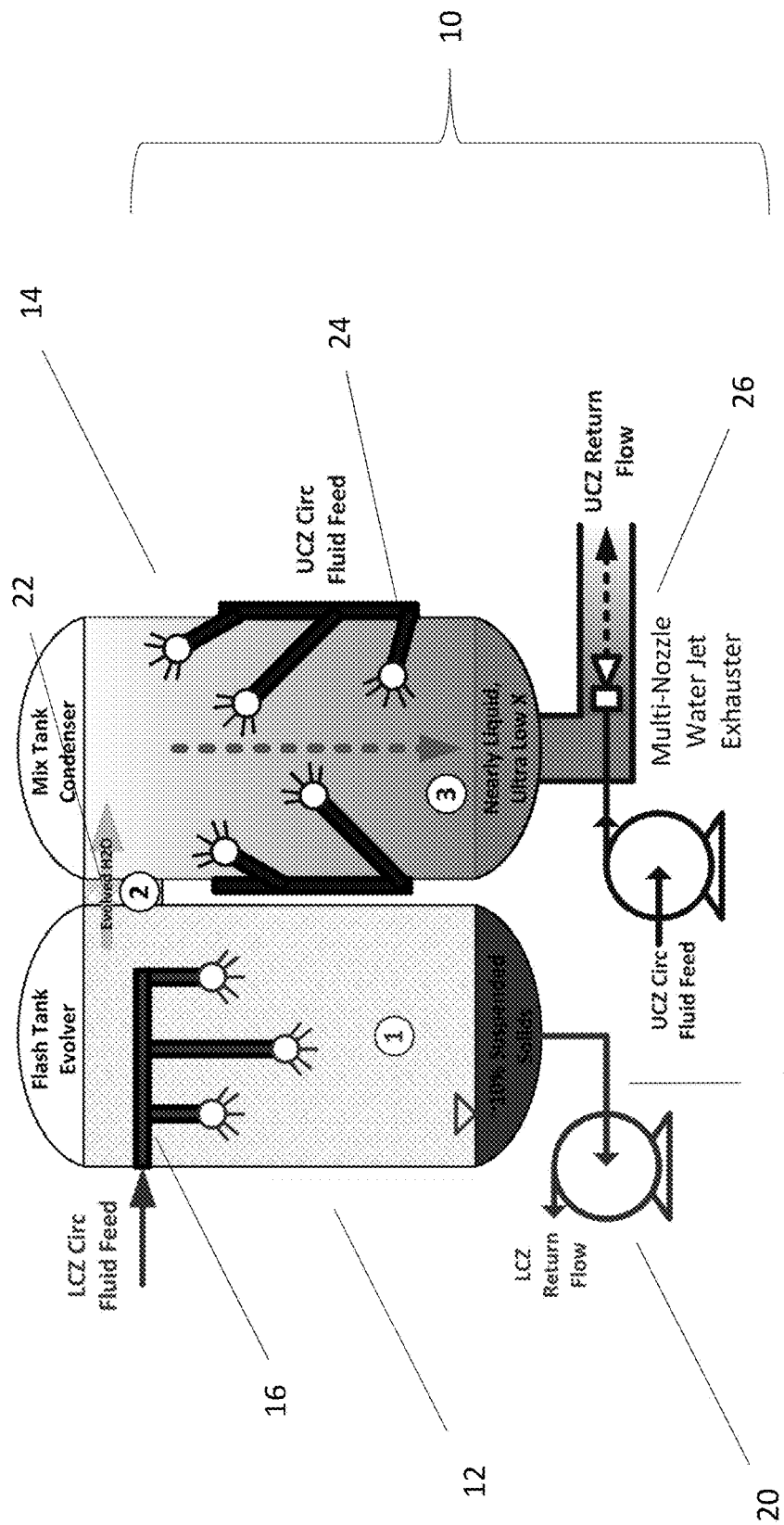
FIGS. 5-6 illustrate one embodiment of the presently disclosed Falling Pond Device and corresponding thermodynamic processes respectively.
Figure 6:
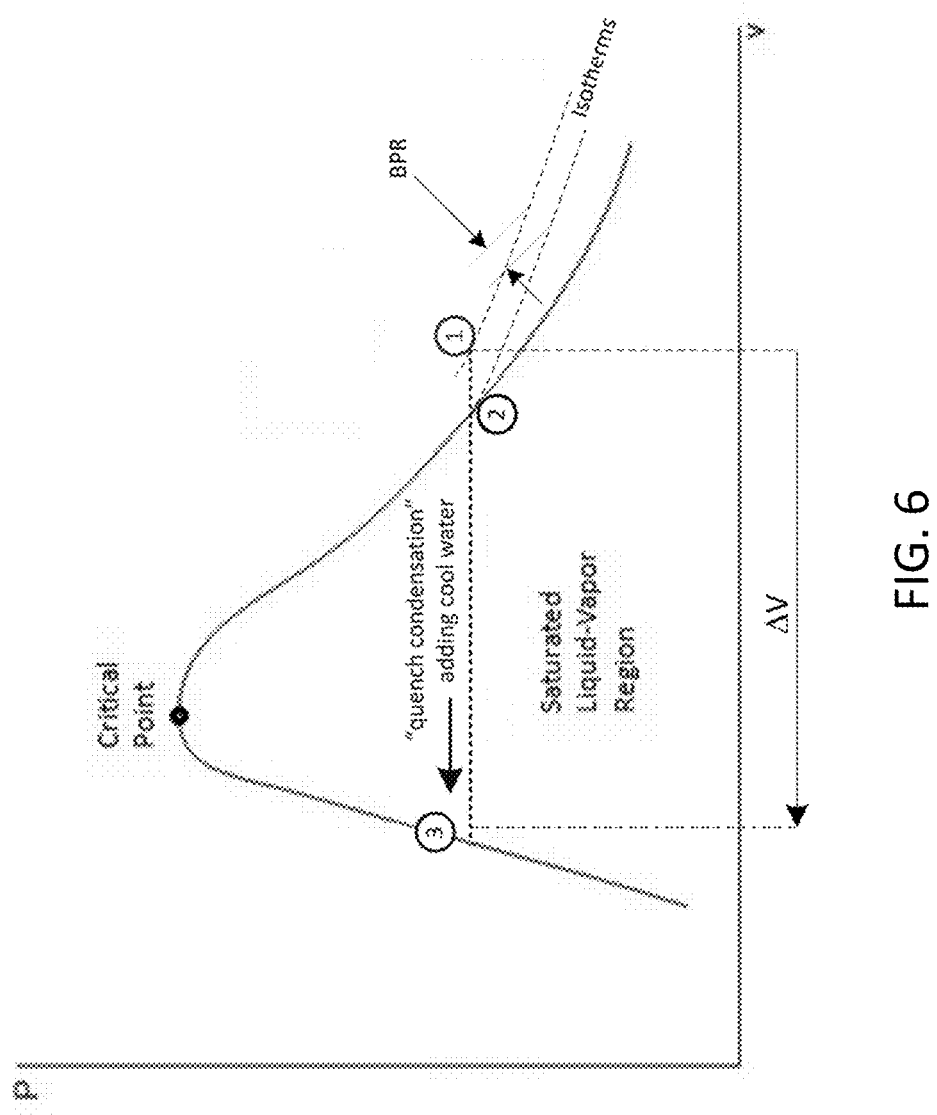

The presently disclosed Falling Pond Device is depicted in FIG. 5. A portion of the hot brine leaving the heat engine, before being returned to the LCZ (notionally shown in FIG. 3), is routed to the upper left of GEM's Falling Pond Device (FPD) in FIG. 5. The first process of the FPD flashes a portion of the LCZ brine (typically 1% of the total LCZ circulation through the heat engine) in a Flash Tank Evolver, driving H2O off the saturated brine. The remaining LCZ brine, with approximately 10% suspended solids versus dissolved solids given that a portion of the solvent has been removed from the saturated solution, is gathered in the bottom of the tank and routed to the LCZ return line via a simple pump. The evolved water in the flash tank, noted as Point 1 in FIG. 5, is superheated steam, corresponding to Point 1 in FIG. 6 which depicts the thermodynamic process of the FPD. Note that when taking into account the Boiling Point Rise (BPR) of the saturated brine, as shown in FIG. 6, the evolved H2O will be slightly superheated (typically 13° F. superheat).

Figure 3:
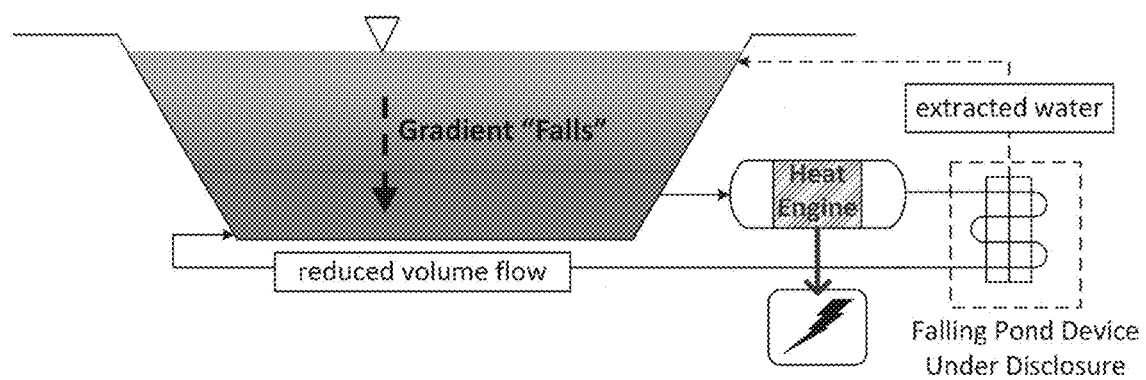
FIG. 3 illustrates a basic operation of an exemplary Falling Pond Device in operation with an SGSP system to maintain the salinity gradient.

The second process of the FPD in FIG. 5 occurs in the Mix Tank Condenser, where the superheated steam is recovered for return to the surface of the SGSP (as shown in FIG. 3). The mix tank is plumbed to utilize the cool surface water, from the ORC circulation (as shown in FIG. 2), to augment the recovery process; this process will likewise typically require approximately 1% of the total UCZ flow. As the low-pressure superheated steam is drawn into the mix tank through a demister, which is wetted with a portion of the cool water flow (Point 2 in FIGS. 5 and 6), it is desuperheated. As the now-saturated steam is drawn down the mix tank, cool water is continually added to effectively "quench condense" the steam, reducing its specific volume as noted in FIG. 6. When the saturated mixture reaches the bottom of the mix tank, it is very low in quality x (x=ratio of vapor mass to total mass in the fluid mixture) and quite nearly liquid. At this point, noted as Point 3 in FIGS. 5 and 6, the fluid mixture is removed to the UCZ return line by a multi-nozzle water jet exhauster. The expected range in required power for this prime mover is 0.3-4.0 kW, which range covers the realized performance of the exhauster: the upper range is to indicate required power typical of moving gases, where the shearing effect for momentum transfer is less than that for liquids, and the lower range would be for moving liquid. As the FPD is optimized for "quench condensing" and the end state more closely approaches liquid, the lower power requirement will be approached. Once optimization is achieved, the multi-nozzle exhauster may be replaced with a single-nozzle eductor, as intended for liquid vs. gas (lower cost, less maintenance), or possibly even a simple pump.

FIG. 7 shows typical performance projections for the FPD in operation maintaining the SGSP gradient in both ponds of a GEM 250 kW SGSP module. The upper left hand of the table in FIG. 7 ("Falling Pond Velocity & Flow") shows the required downward velocity and extracted water rate as 1.6 inches per year and 1.11 gpm respectively. For reference, the upper right hand of the table ("Typical 250 kW ORC Operating Conditions") shows typical flow rates and temperatures for the heat engine. Operating conditions for the Flash Tank Evolver and the Mix Tank Condenser are given in the table ("Conditions in the Flash Tank Evolver" and "Conditions in the Mix Tank Condenser" respectively). Note the reduction in volume flow achieved by the FPD, highlighted in the table, where the "Uncondensed Vapor Flow Rate" in the Evolver is given as 852 cfm and the "Mix Tank Condensed Exit Flow" in the Condenser is shown as 8.2 cfm: without the "quench condensation" feature dramatically reducing the volume flow rate, the power required to recover the superheated steam in the FPD as shown would be prohibitive. The projected performances of the prime movers are noted in the table of FIG. 7 as "Mix Tank Prime Mover Performance" and "Flash Tank Prime Mover Performance". The prime mover in the Flash Tank is a simple pump, whereas the prime mover in the Mix Tank will initially be a multi-nozzle water jet exhauster (e.g., a Schutte & Koerting 5" Multi-Nozzle Water Jet Exhauster). Under the projections for the Mix Tank the projected performance of a single-nozzle water jet eductor is noted (e.g., a Schutte & Koerting 1.5" Water Jet Eductor) to bracket the expected performance for the Mix Tank's Prime Mover (i.e., the lower value corresponding to shear-entrainment more typical to liquids versus gas). Lastly the heat losses due to moving the hot H2O from the LCZ to the UCZ is noted ("FPD Thermal Parasitic Loss") and the projected parasitic loads are tallied in the lower left part of the table in FIG. 7. The resultant parasitic losses are considered very workable from an SGSP commercialization standpoint.

Figure 1:
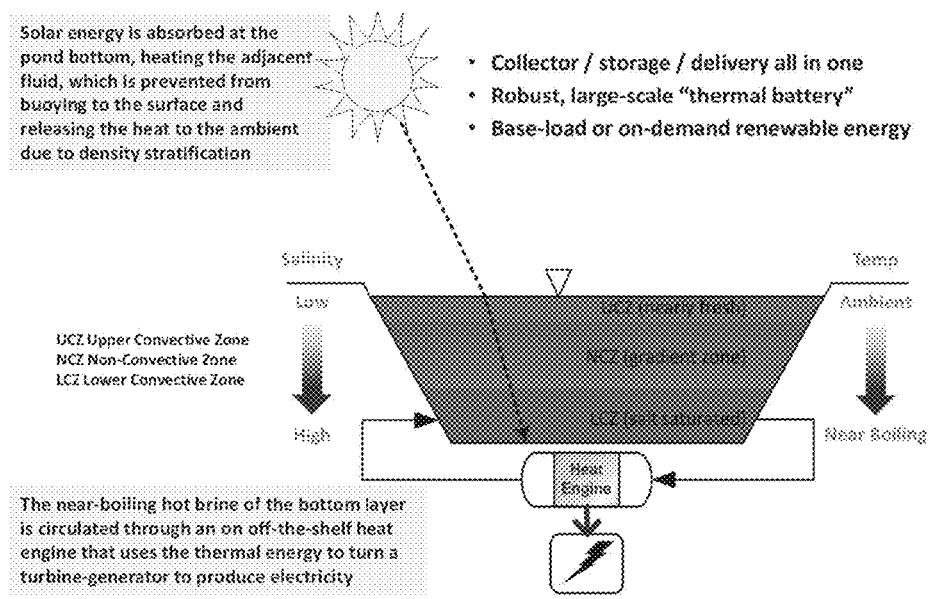
FIG. 1 illustrates a perspective diagram of the basic workings of an exemplary Salinity Gradient Solar Pond (SGSP).

FIG. 1 shows the basic workings of a Salinity Gradient Solar Pond (SGSP). A SGSP is a shallow, salt-gradient pond that enables the collection and storage of solar thermal energy, as noted in the figure. In the SGSP, solar energy is absorbed by the pond's bottom which in turn heats the adjacent salt-saturated fluid (the "Lower Convective Zone", or LCZ, in FIG. 1). Since the LCZ is heavier than the layers above it due to its higher salinity, the heated fluid cannot rise in the pond and cool, like a normal pond, but rather remains in the bottom layer, getting hotter as it stores more solar thermal energy. Over time, typically several months from initial construction, as the LCZ stores more and more solar thermal energy, the brine temperature will approach boiling. This collected and stored solar thermal energy can be withdrawn (pumped hot brine) as process heat which can be used to generate electricity using an off the shelf, low-temperature heat engine. Acting as a large-scale solar thermal battery, the SGSP can collect and store heat, and deliver power at an average, uniform rate (base-load), or can deliver power on an as needed basis (on-demand) giving distribution control of the power output rather than being forced to produce power solely when the wind blows or the sun shines, making SGSP systems many times more effective than intermittent renewables.

FIGS. 2A-2C depicts the Good Earth Mechanics (GEM) 250 kW Commercial SGSP Module, which uses two pond units for each module. The ponds are bermed impoundments versus excavated holes, where the dirt from the pond centers is used to form the berms. The GEM SGSP systems are modularly extensible: the GEM SGSP power system site can be as small as 250 kW, or scaled up to 100's of MW's, by simply adding more SGSP modules. A cutaway of the GEM SGSP system in figure shows how a typical off-the-shelf, low-temperature Organic Rankine Cycle (ORC) heat engine circulates both the pond's hot bottom brine and the cool surface water. The hot brine is the thermal source and the cool water serves as the ORC heat sink; it's the temperature difference between the bottom and the top of the SGSP system that drives the heat engine. Also note in the figure where it's notationally indicated that the disclosed Falling Pond Device ("FP Device" in the figure) will plumb to the hot and cold SGSP circulation.

FIG. 3 depicts the basic operation of a generic Falling Pond Device in operation with an SGSP system to maintain the salinity gradient. Due to the salinity stratification in the SGSP the upward diffusion of salt is a natural consequence. Controlling the salinity gradient in SGSP systems is vital to their reliable and efficient operation. One method proposed for controlling the salinity gradient is the Falling Pond method depicted in the figure. A "Falling Pond Device" shown in the figure is intended to continuously maintain the salinity gradient in-place by extracting water from the saturated brine on the bottom of the pond and moving it to the top; this action causes the pond's layers to be continuously cycled downward, or "fall". This rate of fall, or downward velocity, can be controlled to match the rate of upward diffusion of salt in the SGSP, thereby maintaining the gradient in-place.

Figure 4:
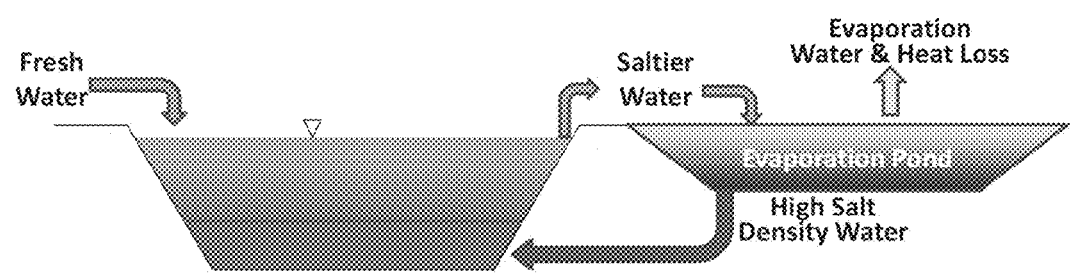
FIG. 4 illustrates one embodiment of a conventionally practiced method for controlling the SGSP gradient termed the "Surface Wash Method".

FIG. 4 shows the conventionally practiced method for controlling the SGSP gradient termed the "Surface Wash Method". In the Surface Wash method the salt is allowed to diffuse upward to the surface layer. As the surface layer gets saltier, it is replaced with fresh water, or "washed". The displaced salty surface water is evaporated to concentrated salt brine in a separate evaporation pond and then returned to the SGSP bottom. This method, while workable for SGSP demonstration work and the typical gradient maintenance practice heretofore, is not practical for large scale SGSP commercialization due to the additional land requirement and the higher water and heat losses required to practice the method. The Falling Pond practice is superior as it minimizes water, heat loss, required land, and costs compared with the Surface Wash method.

FIGS. 5 and 6 shows the presently disclosed FPD and corresponding thermodynamic processes respectively. A portion of the hot brine leaving the heat engine, before being returned to the LCZ (notionally shown in FIG. 3), is routed to the upper left of GEM's FPD in FIG. 5. The first process of the FPD flashes a portion of the LCZ brine in a Flash Tank Evolver, driving H2O off the saturated brine. Note that when taking into account the Boiling Point Rise (BPR) of the saturated brine, as shown in FIG. 6, the evolved H2O will be slightly superheated (typically 13° F. superheat), noted as Point 1 in FIGS. 5 and 6. The remaining LCZ brine, with approximately 10% suspended solids given that a portion of the solvent has been removed from the saturated solution, is gathered in the bottom of the flash tank and routed to the LCZ return line via a simple pump. The second process of the FPD in FIG. 5 occurs in the Mix Tank Condenser, where the superheated steam is recovered for return to the surface of the SGSP (as shown in FIG. 3). The mix tank is plumbed to utilize the cool surface water, from the ORC circulation (as shown in FIG. 2). As the low-pressure superheated steam is drawn into the mix tank through a demister, which is wetted with a portion of the cool water flow (Point 2 in FIGS. 5 and 6), it is desuperheated. As the now-saturated steam is drawn down the mix tank, cool water is continually added to effectively "quench condense" the steam, reducing its specific volume as noted in FIG. 6. When the saturated mixture reaches the bottom of the mix tank, it is very low in quality x (x=ratio of vapor mass to total mass in the fluid mixture) and quite nearly liquid. At this point, noted as Point 3 in FIGS. 5 and 6, the fluid mixture is removed to the UCZ return line by a multi-nozzle water jet exhauster.

In this embodiment, the Falling Pond Device 10 comprises a pair of tanks, namely a flash tank evolver 12 and a mix tank condenser 14. Preferably, the flask tank evolver 12 further comprises a circulation fluid feed 16 from the LCZ, wherein a portion of the hot brine is routed into the flash tank evolver 12. Once the flash tank evolver 12 drives the H2O off of the saturated brine, the remaining LCZ brine, will be routed to a LCZ return line 18 via a simple pump 20. The low-pressure superheated steam may be drawn into the mix tank condenser 14 via a demister 22; additionally the mix tank condenser 14 includes a UCZ circulation fluid feed 24 to draw in cool water and condense the superheated steam. Finally, once the condensed mixture reaches the bottom of the mix tank condenser 14, the mixture is removed to the UCZ via a multi-nozzle water jet exhauster 26.

FIG. 7 shows typical performance projections for the FPD in operation maintaining the SGSP gradient in both ponds of a GEM 250 kW SGSP module. The projected data are grouped according to their function in the FPD/SGSP system (e.g., "Falling Pond Velocity & Flow"). The table in the figure concludes at the bottom with a tally of the projected parasitic loads, which are considered to be very workable from an SGSP commercialization standpoint.

The present invention, a Falling Pond Device (FPD), provides an efficient means for practicing the Falling Pond method for gradient maintenance in an SGSP power system. The Falling Pond method is more efficient than previously practiced methods for SGSP gradient maintenance, e.g., the Surface Wash method, and that improved efficiency is essential for the commercial practice of SGSP power systems. The commercialization of the SGSP technology is vital to the renewable energy industry, particularly as intermittent renewables are leading to grid management issues and increased costs. The SGSP systems collect and store heat, and are able to deliver power at an average, uniform rate (base-load), or on an as needed basis (on-demand) giving distribution control of the power output rather than being forced to produce power solely when the wind blows or the sun shines. This feature, along with other synergistic benefits which GEM has developed (e.g., large-scale salt sink for environmental remediation), make SGSP systems many times more effective than intermittent renewables. The GEM team is presently engaged in the commercial launch of their SGSP technology and the disclosed invention herein is crucial to that commercial launch.

In conclusion, herein is presented a system and method for implanting the falling pond method to counter the upward diffusion of salt in a SGSP. The invention is illustrated by example in the flow diagrams and figures, and throughout the written description. It should be understood that numerous variations are possible, while adhering to the inventive concept. Such variations are contemplated as being a part of the present invention.

What is claimed is:

1. A system to counter the upward diffusion of salt in a salinity gradient solar pond comprising:
   a flash tank evolver, wherein the flash tank evolver receives a quantity of hot brine from a lower convective zone circulation fluid feed, and wherein the fluid feed flashes a portion of the hot brine through the flash tank evolver to produce superheated steam;
   a mix tank condenser, wherein the condenser draws in a quantity of superheated steam from the flash tank evolver through a demister;
   an upper convective zone circulation fluid feed, wherein the fluid feed circulates a quantity of cool water to desuperheat and condense the superheated steam received from the flash tank evolver; and
   an upper convective zone return line, wherein a fluid mixture is removed from the mix tank condenser to the upper convective zone return line; and
   a lower convective zone return line, wherein the concentrated lower convective zone fluid feed is withdrawn from the flash tank evolver via a pump for return to the salinity gradient solar pond.

2. The system to counter the upward diffusion of salt in a salinity gradient solar pond of claim 1, wherein a quantity of suspended solids removed from the hot brine is routed to a lower convective zone circulation return flow via a simple pump.

3. A method to counter the upward diffusion of salt in a salinity gradient solar pond utilizing the system of claim 1, comprising the steps of:
   routing a quantity of hot brine leaving a heat engine into the flash tank evolver;
   flashing a quantity of the hot brine in the flash tank evolver;
   driving water off of the saturated brine;
   routing the remaining hot brine from the flash tank evolver via a pump for return to the lower convective zone;
   drawing the quantity of superheated steam from the flash tank evolver into the mix tank condenser through a demister;
   wetting the quantity of superheated steam with a portion of cool water flow from a heat engine to desuperheat and condense the steam; and
   removing the fluid mixture from the mix tank condenser to an upper convective zone return flow via a water jet exhauster or pump.

4. The method to counter the upward diffusion of salt in a salinity gradient solar pond of claim 1, further comprising the step of:
   controlling a lower convective zone return pump and upper convective zone jet exhauster (or pump) speeds to manage the upward diffusion of salt to a desired rate.

* * * * *